United States Patent
Vosoughi et al.

(10) Patent No.: US 10,692,249 B2
(45) Date of Patent: Jun. 23, 2020

(54) OCTREE TRAVERSAL FOR ANCHOR POINT CLOUD COMPRESSION

(71) Applicant: Sony Corporation, Tokyo (JP)

(72) Inventors: Arash Vosoughi, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 16/107,638

(22) Filed: Aug. 21, 2018

(65) Prior Publication Data

US 2019/0114808 A1 Apr. 18, 2019

Related U.S. Application Data

(60) Provisional application No. 62/571,468, filed on Oct. 12, 2017.

(51) Int. Cl.
| | |
|---|---|
| *G06T 9/40* | (2006.01) |
| *G06T 7/90* | (2017.01) |
| *G06T 11/00* | (2006.01) |
| *G06K 9/62* | (2006.01) |
| *G06T 9/00* | (2006.01) |

(52) U.S. Cl.
CPC .............. *G06T 9/40* (2013.01); *G06K 9/6223* (2013.01); *G06T 7/90* (2017.01); *G06T 9/001* (2013.01); *G06T 11/001* (2013.01); *G06T 2207/10028* (2013.01)

(58) Field of Classification Search
CPC .. G06T 9/40; G06T 7/90; G06T 9/001; G06T 11/001; G06K 9/6223
USPC ......................................................... 382/240
See application file for complete search history.

(56) References Cited

U.S. PATENT DOCUMENTS

| | | | | |
|---|---|---|---|---|
| 5,280,428 A | * | 1/1994 | Wu | ........................ G01R 33/56 250/363.04 |
| 6,778,173 B2 | | 8/2004 | Han et al. | |
| 9,633,473 B2 | | 4/2017 | Tian et al. | |
| 2014/0306955 A1 | * | 10/2014 | Dionne | ................... G06T 17/00 345/420 |
| 2015/0262416 A1 | * | 9/2015 | Hecht | ..................... G06T 15/08 345/424 |
| 2018/0225844 A1 | * | 8/2018 | Higgs | ....................... G06T 9/40 |
| 2018/0338017 A1 | * | 11/2018 | Mekuria | .................. H04L 69/04 |

OTHER PUBLICATIONS

Markus Arvidsson, "Design and implementation of virtualized sparse voxel octree ray casting", Summary of Master Thesis in Computer Science, Lund University, Faculty of Engineering.

* cited by examiner

*Primary Examiner* — Michael R Neff
(74) *Attorney, Agent, or Firm* — Haverstock & Owens LLP

(57) ABSTRACT

An improved octree traversal implementation improves the color coding gain for point cloud compression. The improved octree traversal order to be used in Anchor PCC or any other octree-based point cloud compression such as Directed Acyclic Graph (DAG). The improved octree traversal makes minimal jumps in 3D space which makes traversed colors more correlated, which improves color coding gain.

17 Claims, 7 Drawing Sheets

US 10,692,249 B2

OCTREE TRAVERSAL FOR ANCHOR POINT CLOUD COMPRESSION

CROSS-REFERENCE TO RELATED APPLICATION(S)

This application claims priority under 35 U.S.C. § 119(e) of the U.S. Provisional Patent Application Ser. No. 62/571,468, filed Oct. 12, 2017 and titled, "IMPROVED OCTREE TRAVERSAL FOR ANCHOR POINT CLOUD COMPRESSION," which is hereby incorporated by reference in its entirety for all purposes.

FIELD OF THE INVENTION

The present invention relates to data compression. More specifically, the present invention relates to point cloud compression.

BACKGROUND OF THE INVENTION

Point clouds are huge data sets of three dimensional points including information such as color and distance. The point clouds are able to be acquired frequently such as when using LIght Detection And Ranging (LIDAR) on a moving vehicle which repeatedly acquires point clouds. Compressing the vast amount of point cloud data is important to enable practical processing of the data.

SUMMARY OF THE INVENTION

An improved octree traversal implementation improves the color coding gain for point cloud compression. The improved octree traversal order to be used in Anchor PCC or any other octree-based point cloud compression such as Directed Acyclic Graph (DAG). The improved octree traversal makes minimal jumps in 3D space which makes traversed colors more correlated, which improves color coding gain.

In one aspect, a method comprises generating an octree, wherein the octree includes a plurality of voxels, and each of the voxels are represented by a plurality of coordinates and traversing the octree, wherein only one coordinate changes when moving from a voxel to a next voxel in the octree. The voxels include color attributes. Traversing the octree includes moving from (0,0,0) to (0,1,0) to (0,1,1) to (0,0,1) to (1,0,1) to (1,1,1) to (1,1,0) to (1,0,0). The method further comprises receiving a point cloud. The method further comprises deriving a palette of colors, wherein the octree includes select colors from the palette of colors. The method further comprises deriving indexes to the palette of colors. The method further comprises encoding a point cloud including traversing the octree.

In another aspect, an apparatus comprises a non-transitory memory for storing an application, the application for: generating an octree, wherein the octree includes a plurality of voxels, and each of the voxels are represented by a plurality of coordinates and traversing the octree, wherein only one coordinate changes when moving from a voxel to a next voxel in the octree and a processor coupled to the memory, the processor configured for processing the application. The voxels include color attributes. Traversing the octree includes moving from (0,0,0) to (0,1,0) to (0,1,1) to (0,0,1) to (1,0,1) to (1,1,1) to (1,1,0) to (1,0,0). The application is further for receiving a point cloud. The application is further for deriving a palette of colors, wherein the octree includes select colors from the palette of colors. The application is further for deriving indexes to the palette of colors. The application is further for encoding a point cloud including traversing the octree.

In another aspect, a system comprises a first computing device configured for: generating an octree, wherein the octree includes a plurality of voxels, and each of the voxels are represented by a plurality of coordinates and traversing the octree, wherein only one coordinate changes when moving from a voxel to a next voxel in the octree, encoding a point cloud including traversing the octree and a second computing device configured for: decoding the encoded point cloud. The voxels include color attributes. Traversing the octree includes moving from (0,0,0) to (0,1,0) to (0,1,1) to (0,0,1) to (1,0,1) to (1,1,1) to (1,1,0) to (1,0,0). The first computing device is further for receiving a point cloud. The first computing device is further for deriving a palette of colors, wherein the octree includes select colors from the palette of colors. The first computing device is further for deriving indexes to the palette of colors.

DETAILED DESCRIPTION OF THE PREFERRED EMBODIMENT

Point Cloud Compression ("PCC") such as Anchor PCC generates an octree to code an input point cloud. Once the octree is generated, the occupied voxels are traversed, and their information (e.g., geometry and attributes such as color) is coded. A new octree traversal is described herein that robustly improves the color coding gain of PCC. Traversing an octree is the process of finding a subset of voxels in an octree pierced by a directed line.

Figure 1:
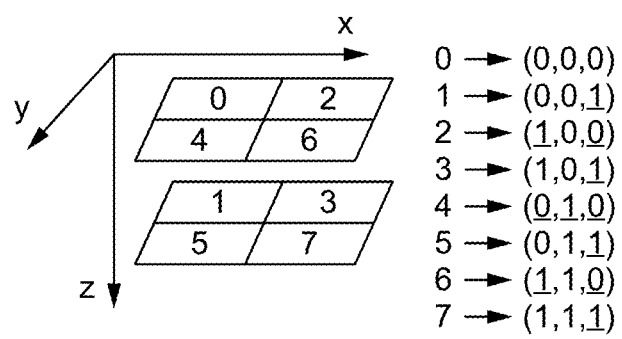
FIG. 1 illustrates a diagram of the order by which 8 children voxels (e.g., leaf nodes) of the same parent are traversed in an octree adopted by the Anchor PCC according to some embodiments.

FIG. 1 illustrates a diagram of the order by which 8 children voxels (e.g., leaf nodes) of the same parent are traversed in an octree adopted by the Anchor PCC according to some embodiments. Each voxel is also represented by its three coordinates in 3D space. For example, the coordinates of voxel 6 are represented by (1, 1, 0). It is assumed that all voxels are occupied, and thus each one has an attribute (e.g., color). Traversing the voxels as in FIG. 1 (which is adopted by Anchor PCC) leads to big jumps in 3D space. These big jumps in 3D make the serialized neighboring colors to be less correlated, assuming that attributes are locally correlated in 3D space. For example, by going from voxel 3 to 4, all of the x, y, and z coordinates are changed (changes in coordinates are indicated by underlining). Therefore, even though voxels 3 and 4 are not very correlated, they are traversed one after the other.

Figure 2:
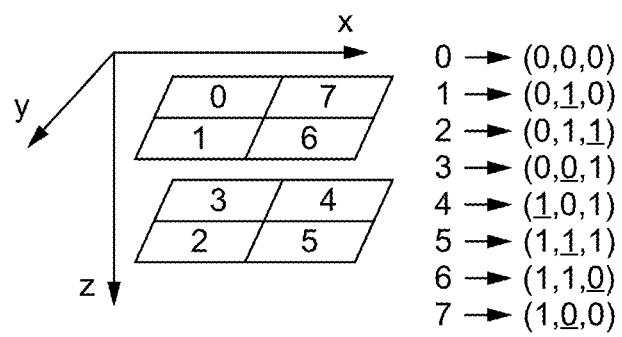
FIG. 2 illustrates a diagram of an octree traversal scheme according to some embodiments.
Figure 3A:
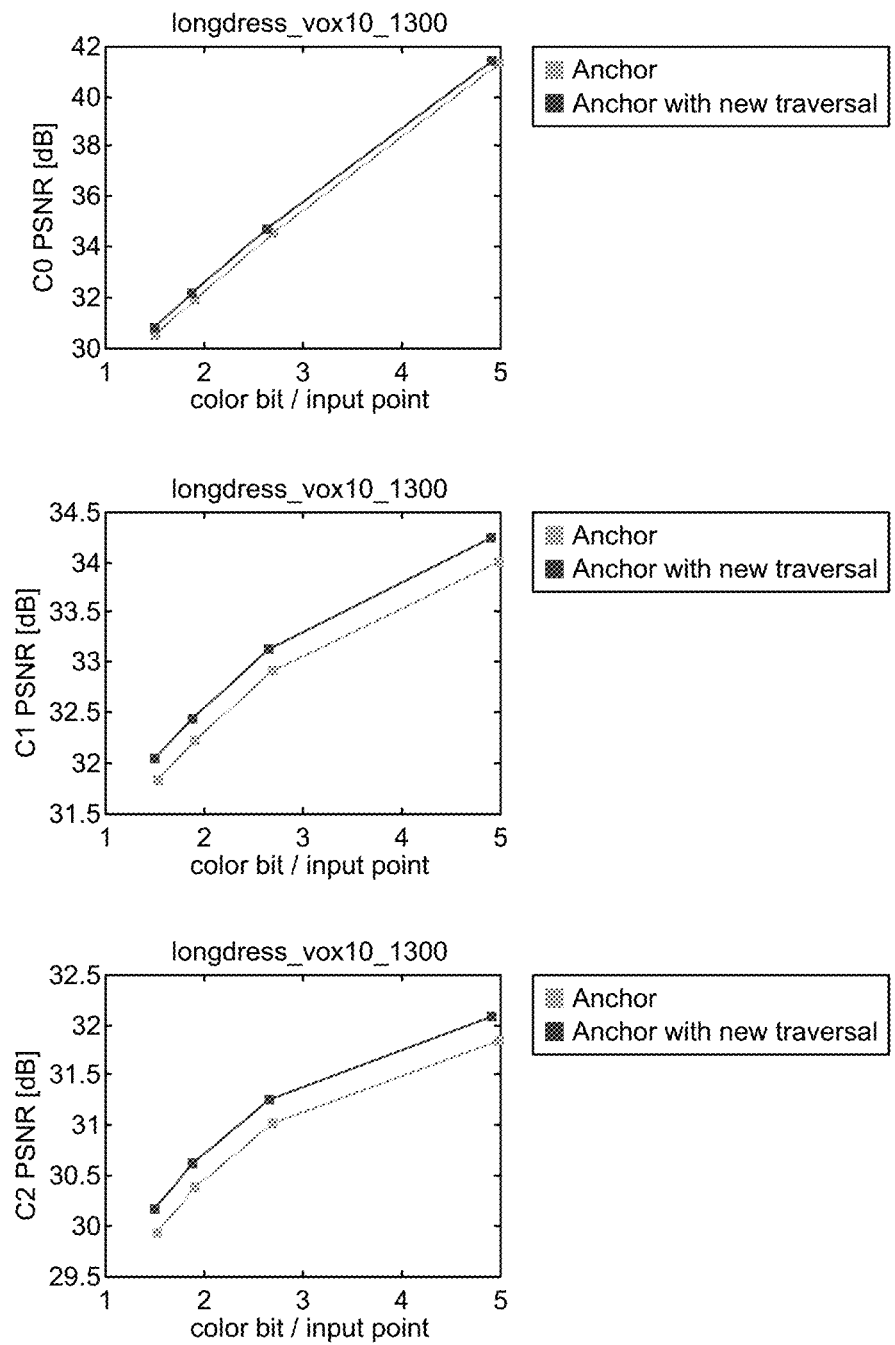
FIGS. 3A-D illustrate charts comparing the improved octree traversal implementation and Anchor PCC according to some embodiments.
Figure 3B:
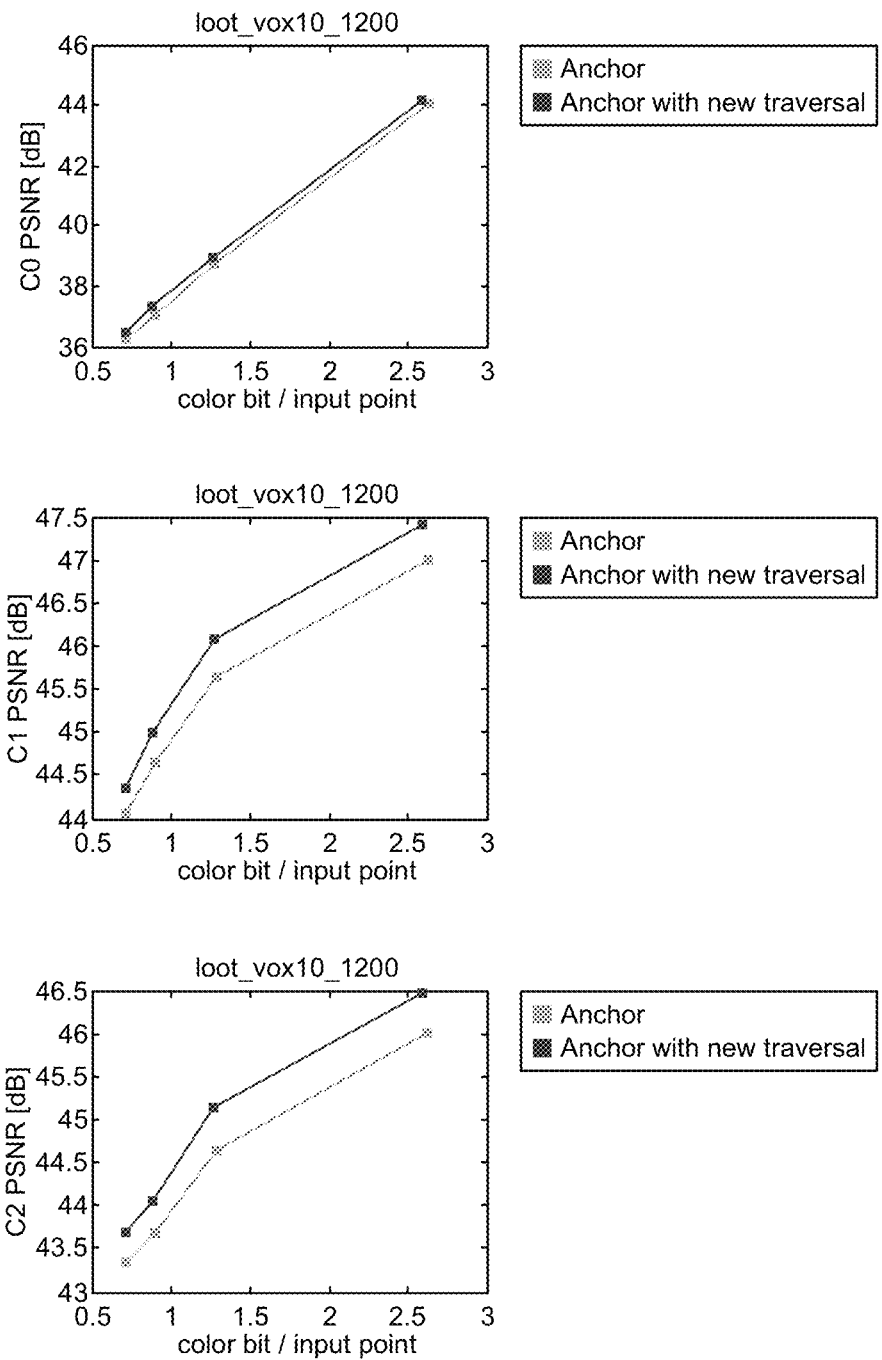
Figure 3C:
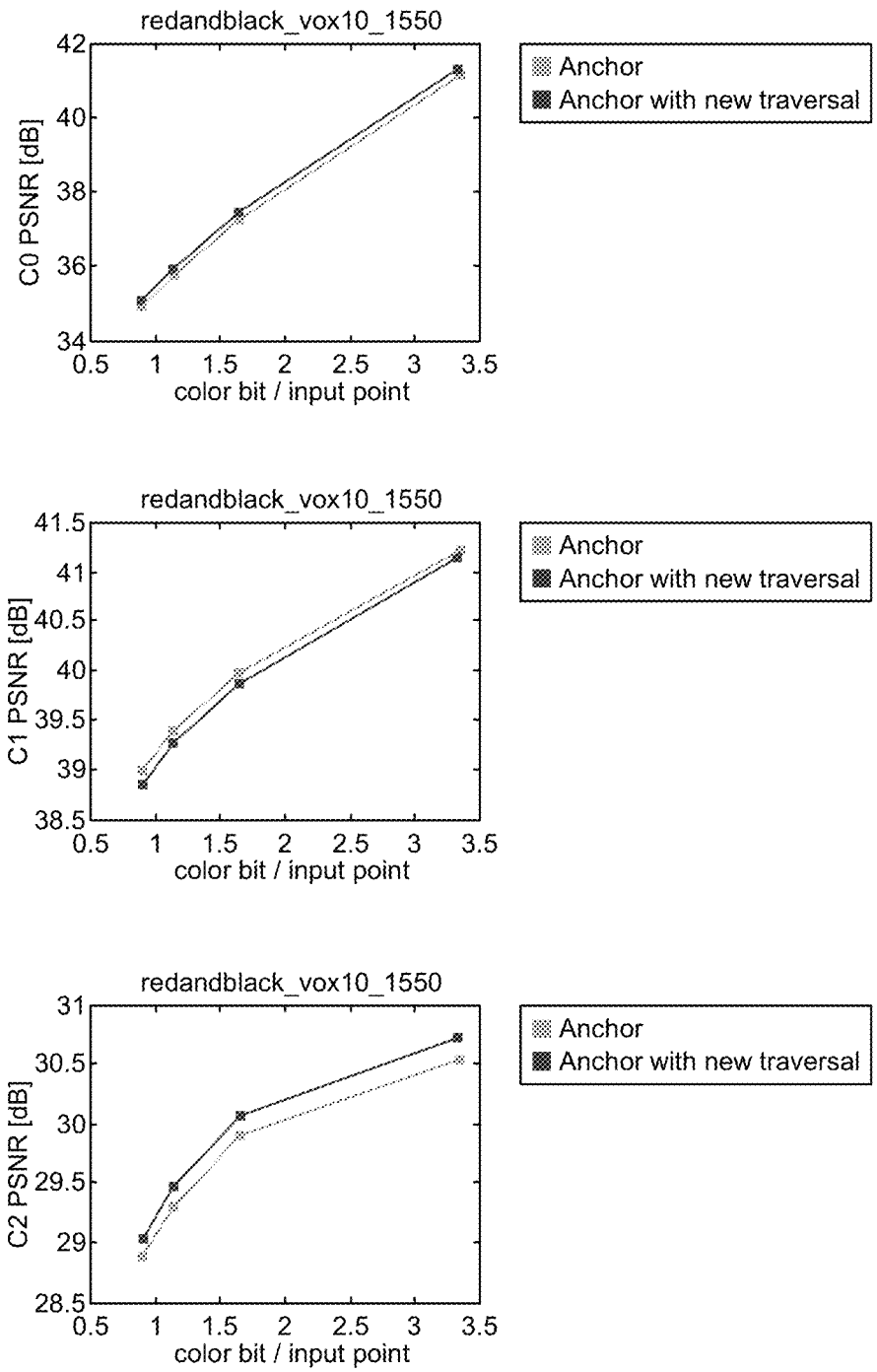
Figure 3D:
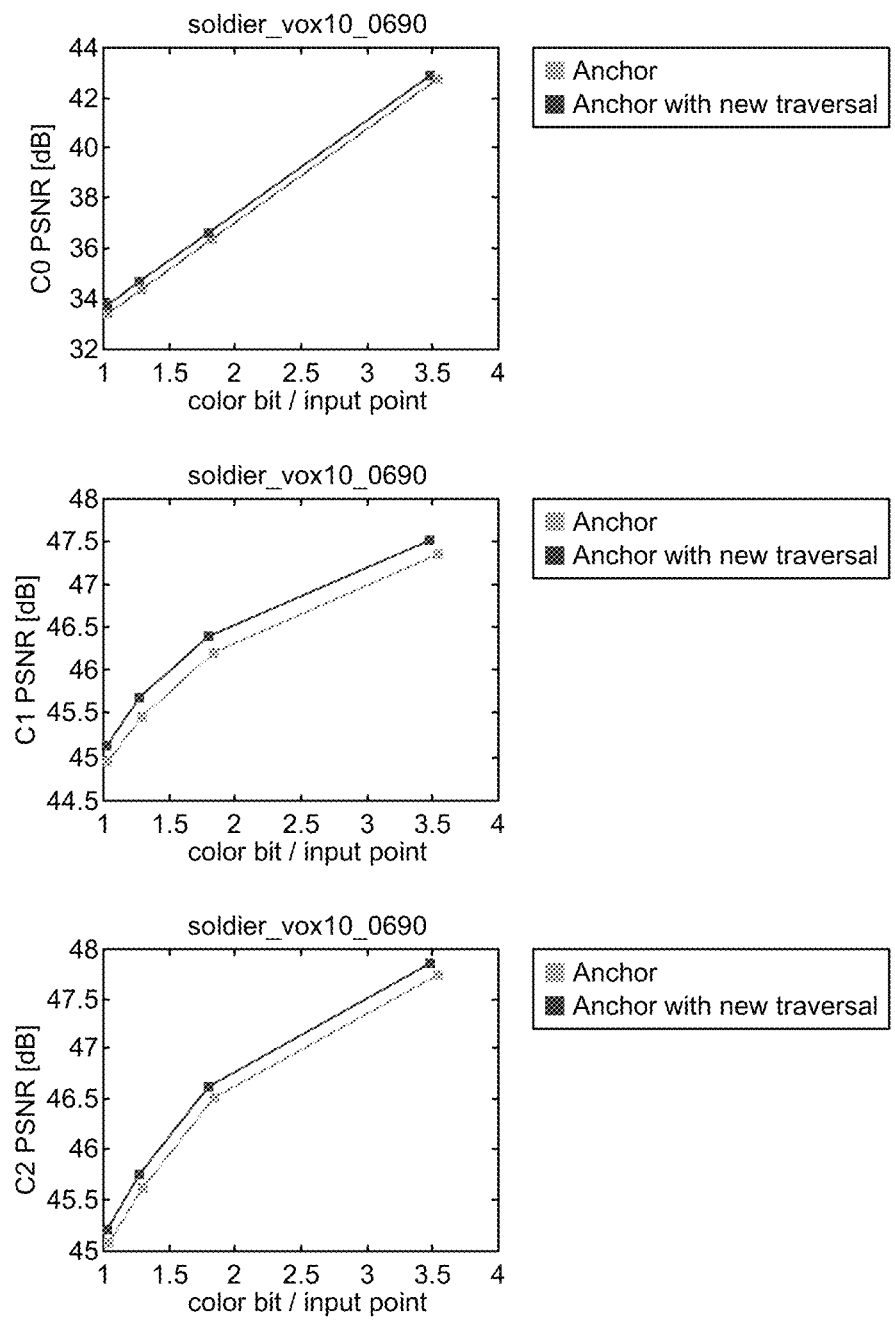

FIG. 2 illustrates a diagram of an octree traversal scheme according to some embodiments. It is evident from the figure that traversing the voxels via the indicated order leads to a minimal number of changes in coordinates. More precisely, in traversing from any voxel i to voxel i+1, only 1 coordinate is changed. This implies a minimal jump in 3D space, which causes the serialized color data to be more correlated compared to the way adopted by the Anchor PCC indicated in FIG. 1. This method of traversal is also able to be generalized on a localized basis (e.g., cloud macroblock level) whereas for each macroblock a more optimal scanning is able to be found and signaled to the decoder.

FIGS. 3A-D illustrate charts comparing the improved octree traversal implementation and Anchor PCC according to some embodiments. As is shown, in general, the improved octree traversal implementation provides better color coding. Specifically, RD curves are depicted. C0, C1, and C2 represent the Peak Signal-to-Noise Ratio (PSNR) in dB computed for Y, Cb, and Cr components, respectively. It is able to be seen that the traversal method described herein almost always improves the coding efficiency of the Anchor PCC.

Figure 4:
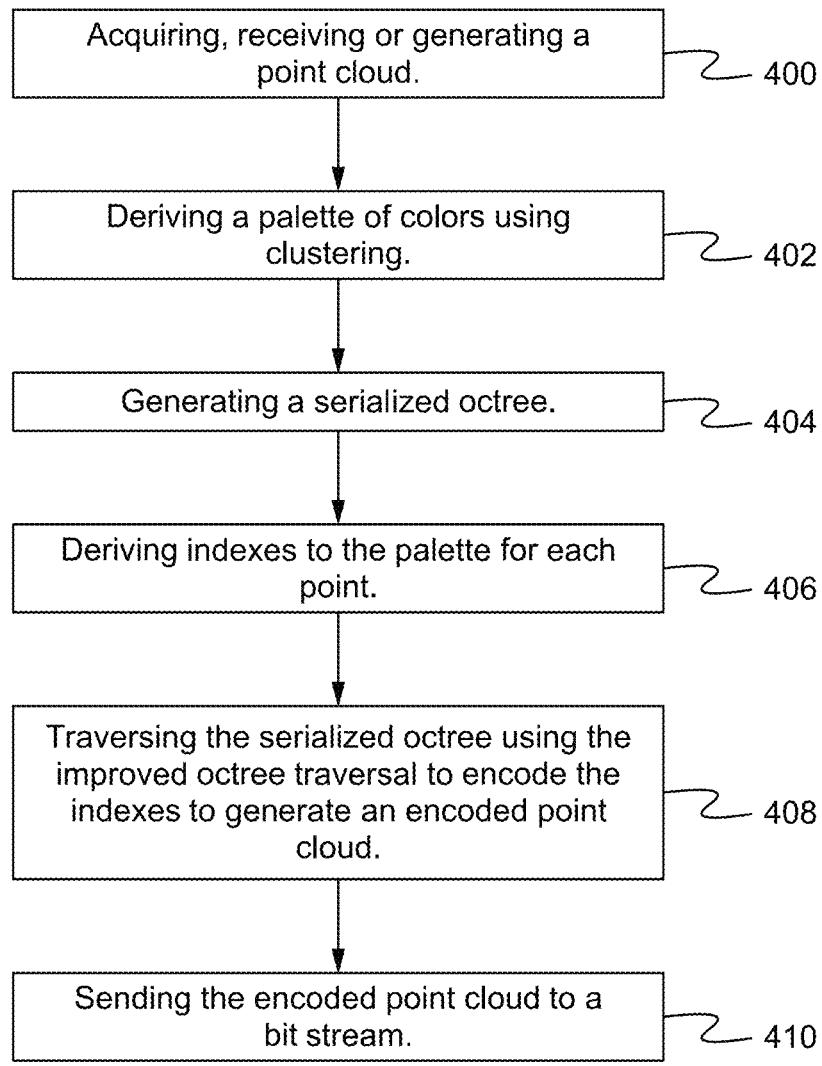
FIG. 4 illustrates a flowchart of a method of encoding using improved octree traversal according to some embodiments.

FIG. 4 illustrates a flowchart of a method of encoding using improved octree traversal according to some embodiments. In the step 400, a point cloud is acquired, received or generated. A palette of colors (e.g., 10 color palette) is derived using clustering, in the step 402. Then, a serialized Octree is generated, in the step 404. The serialized Octree includes select colors from the palette. From the serialized Octree, indexes to the palette are derived for each point, in the step 406. In the step 408, the serialized Octree is traversed using the improved octree traversal to encode the indexes to generate an encoded point cloud. In the step 410, the encoded point cloud is sent to a bit stream. In some embodiments, additional or fewer steps are implemented. For example, the encoded point cloud data is received and decoded, in some embodiments. In some embodiments, the order of the steps are modified.

Figure 5:
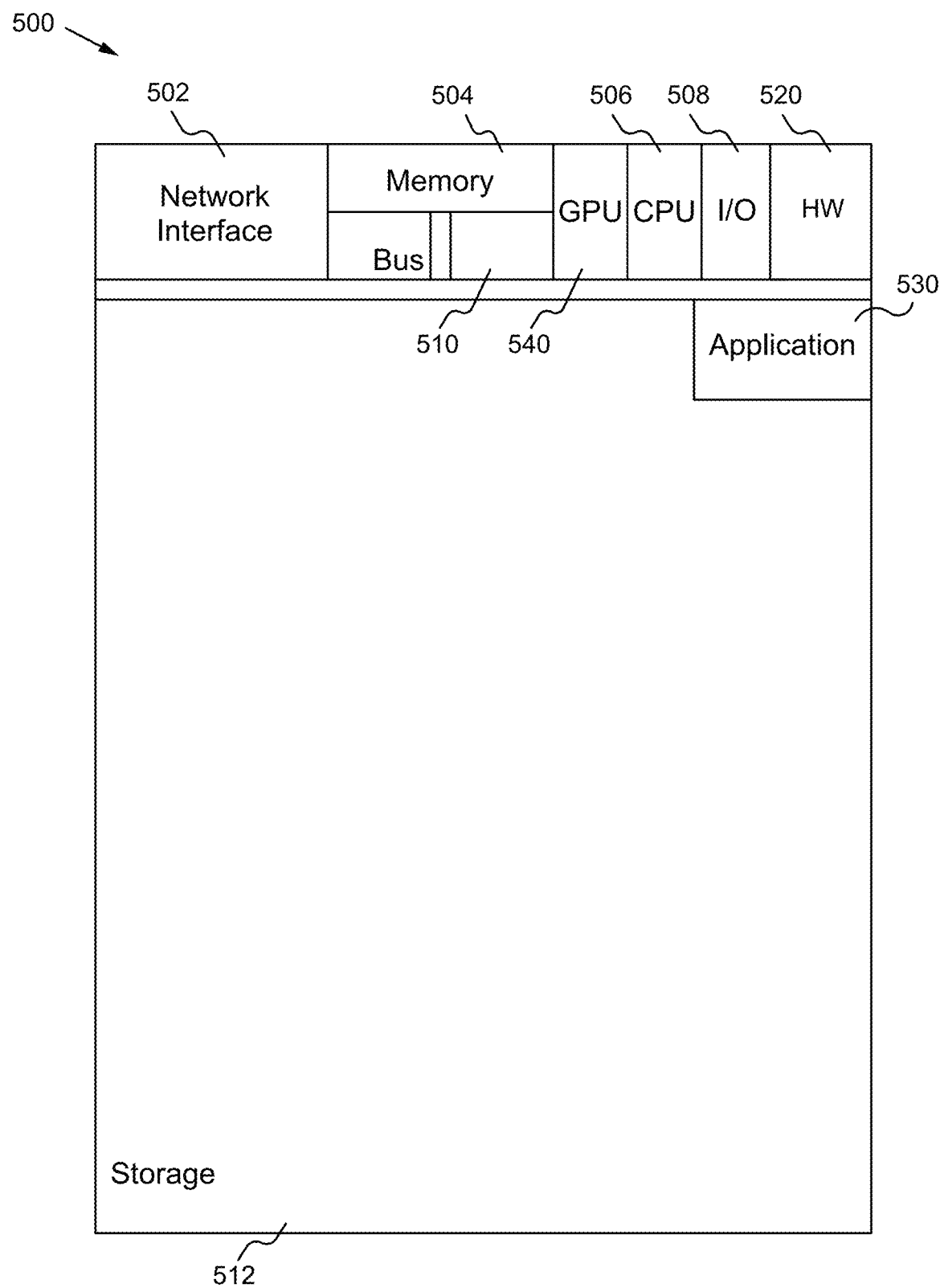
FIG. 5 illustrates a block diagram of an exemplary computing device configured to implement improved octree traversal according to some embodiments.

FIG. 5 illustrates a block diagram of an exemplary computing device configured to implement improved octree traversal according to some embodiments. The computing device 500 is able to be used to acquire, store, compute, process, communicate and/or display information such as images and videos. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, High Definition disc/drive, ultra-HD drive, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, screen, printer, modem, touchscreen, button interface and other devices. Improved octree traversal application(s) 530 used to implement the improved octree traversal method are likely to be stored in the storage device 512 and memory 504 and processed as applications are typically processed. More or fewer components shown in FIG. 5 are able to be included in the computing device 500. In some embodiments, improved octree traversal hardware 520 is included. Although the computing device 500 in FIG. 5 includes applications 530 and hardware 520 for the improved octree traversal method, the improved octree traversal method is able to be implemented on a computing device in hardware, firmware, software or any combination thereof. For example, in some embodiments, the improved octree traversal applications 530 are programmed in a memory and executed using a processor. In another example, in some embodiments, the improved octree traversal hardware 520 is programmed hardware logic including gates specifically designed to implement the improved octree traversal method.

In some embodiments, the improved octree traversal application(s) 530 include several applications and/or modules. In some embodiments, modules include one or more sub-modules as well. In some embodiments, fewer or additional modules are able to be included.

In some embodiments, the improved octree traversal hardware 520 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the improved octree traversal described herein, devices such as digital cameras/camcorders are used to acquire content. The improved octree traversal is able to be implemented with user assistance or automatically without user involvement to efficiently encode the content.

In operation, the improved octree traversal improves traversal of octree data. The results show that much better color coding is achieved with improved octree traversal compared to Anchor PCC.

Some Embodiments of Improved Octree Traversal for Anchor Point Cloud Compression 1. A method comprising:
    generating an octree, wherein the octree includes a plurality of voxels, and each of the voxels are represented by a plurality of coordinates; and
    traversing the octree, wherein only one coordinate changes when moving from a voxel to a next voxel in the octree.
2. The method of clause 1 wherein the voxels include color attributes.
3. The method of clause 1 wherein traversing the octree includes moving from (0,0,0) to (0,1,0) to (0,1,1) to (0,0,1) to (1,0,1) to (1,1,1) to (1,1,0) to (1,0,0).
4. The method of clause 1 further comprising receiving a point cloud.
5. The method of clause 1 further comprising deriving a palette of colors, wherein the octree includes select colors from the palette of colors.
6. The method of clause 5 further comprising deriving indexes to the palette of colors.
7. The method of clause 1 further comprising encoding a point cloud including traversing the octree.
8. An apparatus comprising:
    a non-transitory memory for storing an application, the application for:

generating an octree, wherein the octree includes a plurality of voxels, and each of the voxels are represented by a plurality of coordinates; and traversing the octree, wherein only one coordinate changes when moving from a voxel to a next voxel in the octree; and a processor coupled to the memory, the processor configured for processing the application.

9. The apparatus of clause 8 wherein the voxels include color attributes.

10. The apparatus of clause 8 wherein traversing the octree includes moving from (0,0,0) to (0,1,0) to (0,1,1) to (0,0,1) to (1,0,1) to (1,1,1) to (1,1,0) to (1,0,0).

11. The apparatus of clause 8 wherein the application is further for receiving a point cloud.

12. The apparatus of clause 8 wherein the application is further for deriving a palette of colors, wherein the octree includes select colors from the palette of colors.

13. The apparatus of clause 12 wherein the application is further for deriving indexes to the palette of colors.

14. The apparatus of clause 8 wherein the application is further for encoding a point cloud including traversing the octree.

15. A system comprising:
a first computing device configured for:
generating an octree, wherein the octree includes a plurality of voxels, and each of the voxels are represented by a plurality of coordinates; and traversing the octree, wherein only one coordinate changes when moving from a voxel to a next voxel in the octree;

encoding a point cloud including traversing the octree; and a second computing device configured for:
decoding the encoded point cloud.

16. The system of clause 15 wherein the voxels include color attributes.

17. The system of clause 15 wherein traversing the octree includes moving from (0,0,0) to (0,1,0) to (0,1,1) to (0,0,1) to (1,0,1) to (1,1,1) to (1,1,0) to (1,0,0).

18. The system of clause 15 wherein the first computing device is further for receiving a point cloud.

19. The system of clause 15 wherein the first computing device is further for deriving a palette of colors, wherein the octree includes select colors from the palette of colors.

20. The system of clause 19 wherein the first computing device is further for deriving indexes to the palette of colors.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
generating an octree, wherein the octree includes a plurality of voxels, and each of the voxels are represented by a plurality of coordinates; and traversing the octree, wherein only one coordinate changes when moving from a voxel to a next voxel in the octree, wherein traversing the octree includes moving from (0,0,0) to (0,1,0) to (0,1,1) to (0,0,1) to (1,0,1) to (1,1,1) to (1,1,0) to (1,0,0).

2. The method of claim 1 wherein the voxels include color attributes.

3. The method of claim 1 further comprising receiving a point cloud.

4. The method of claim 1 further comprising deriving a palette of colors, wherein the octree includes select colors from the palette of colors.

5. The method of claim 4 further comprising deriving indexes to the palette of colors.

6. The method of claim 1 further comprising encoding a point cloud including traversing the octree.

7. An apparatus comprising:
a non-transitory memory for storing an application, the application for:
generating an octree, wherein the octree includes a plurality of voxels, and each of the voxels are represented by a plurality of coordinates; and traversing the octree, wherein only one coordinate changes when moving from a voxel to a next voxel in the octree, wherein traversing the octree includes moving from (0,0,0) to (0,1,0) to (0,1,1) to (0,0,1) to (1,0,1) to (1,1,1) to (1,1,0) to (1,0,0); and a processor coupled to the memory, the processor configured for processing the application.

8. The apparatus of claim 7 wherein the voxels include color attributes.

9. The apparatus of claim 7 wherein the application is further for receiving a point cloud.

10. The apparatus of claim 7 wherein the application is further for deriving a palette of colors, wherein the octree includes select colors from the palette of colors.

11. The apparatus of claim 10 wherein the application is further for deriving indexes to the palette of colors.

12. The apparatus of claim 7 wherein the application is further for encoding a point cloud including traversing the octree.

13. A system comprising:
a first computing device configured for:
generating an octree, wherein the octree includes a plurality of voxels, and each of the voxels are represented by a plurality of coordinates; and traversing the octree, wherein only one coordinate changes when moving from a voxel to a next voxel in the octree, wherein traversing the octree includes moving from (0,0,0) to (0,1,0) to (0,1,1) to (0,0,1) to (1,0,1) to (1,1,1) to (1,1,0) to (1,0,0);

encoding a point cloud including traversing the octree; and a second computing device configured for:
decoding the encoded point cloud.

14. The system of claim 13 wherein the voxels include color attributes.

15. The system of claim 13 wherein the first computing device is further for receiving a point cloud.

16. The system of claim 13 wherein the first computing device is further for deriving a palette of colors, wherein the octree includes select colors from the palette of colors.

17. The system of claim 16 wherein the first computing device is further for deriving indexes to the palette of colors.

* * * * *